Oct. 1, 1946.  K. C. D. HICKMAN  2,408,639
VACUUM DISTILLATION PROCESS AND APPARATUS
Filed June 20, 1944    2 Sheets-Sheet 1

KENNETH C. D. HICKMAN
INVENTOR

BY *Newton M. Purves*
*Warren H. Cannon*
ATTORNEYS

Oct. 1, 1946. K. C. D. HICKMAN 2,408,639
VACUUM DISTILLATION PROCESS AND APPARATUS
Filed June 20, 1944 2 Sheets-Sheet 2
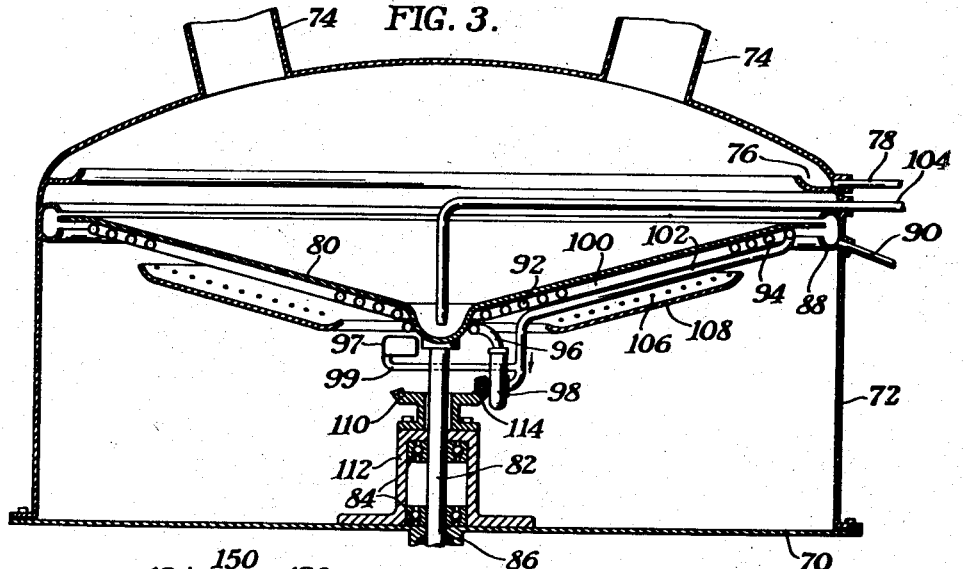
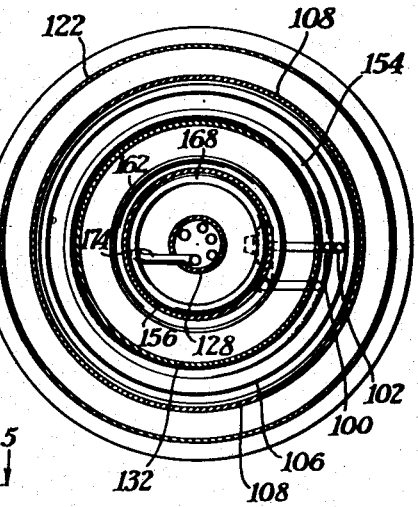
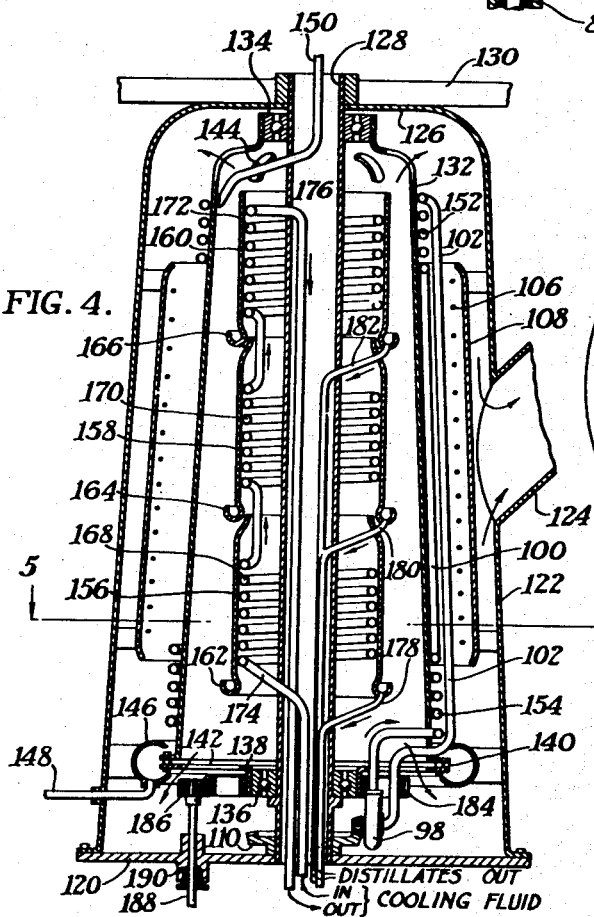
KENNETH C. D. HICKMAN
INVENTOR Patented Oct. 1, 1946

2,408,639

UNITED STATES PATENT OFFICE 2,408,639

VACUUM DISTILLATION PROCESS AND APPARATUS

Kenneth C. D. Hickman, Rochester, N. Y., assignor to Distillation Products, Inc., Rochester, N. Y., a corporation of Delaware Application June 20, 1944, Serial No. 541,253

11 Claims. (Cl. 202—52)

This invention relates to improved process and apparatus for vacuum distillation of thermally decomposable substances while in the form of a thin film.

It is well known in the vacuum distillation art to subject thermally decomposable substances to vacuum distillation while in the form of a thin film. The decomposable distilland is heated only for the short period of time required during flow over the vaporizing surface in a thin film. The undistilled residue can then be cooled and, if desired, the heat content thereof used to preheat the fresh distilland flowing into the still. One of the problems in the employment of such stills is bringing the distilland to distillation temperature and rapidly cooling the undistilled residue using some system of heat exchange. This is required for economy and to diminish to a minimum the period of time in which the distilland is maintained at a high temperature. The problem in centrifugal vacuum stills, and to a lesser extent in gravity flow thin film vacuum stills, is aggravated by structural limitations. Thus, in the centrifugal vacuum stills it is inconvenient to heat or cool the distilland inside the still. Consequently heat exchangers are placed outside the casing. This means that hot liquid has to be piped for relatively long distances and the hot pipes must often pass through the relatively cold walls of the casing. The ultimate exchange of heat is poor and thermal decomposition due to unavoidably long times of heating is increased.

This invention has for its object to avoid the foregoing difficulties. Another object of my invention is to provide improved vacuum distillation process and apparatus whereby efficient heat interchange in a vacuum thin film still is brought about without substantial thermal decomposition. A further object is to provide improved high-vacuum unobstructed path distillation process and apparatus, particularly improved with respect to heat losses and thermal decomposition. Another object is to improve the state of the art. Other objects will appear hereinafter.

These and other objects are accomplished by my invention which includes vacuum distillation process and apparatus wherein a thermally decomposable organic substance is subjected to distillation under vacuum while in the form of a thin film, heat is recovered from the residue and the recovered heat is transferred to the incoming decomposable organic substance while it is disposed in the vacuum still in the form of a thin film. The organic substance is thus preheated under conditions such that it can start to distill as soon as it reaches distillation temperature.

In the following description I have given several of the preferred embodiments of my invention but it is to be understood that these are set forth for the purpose of illustration and not in limitation thereof.

In the accompanying drawings wherein like numbers refer to like parts, I have illustrated several of the preferred embodiments of my invention wherein:

Fig. 3 is a vertical section of a centrifugal still provided with improved heat interchange in accordance with my invention;

Fig. 4 is a modified centrifugal vacuum still provided with a steep conical vaporizing surface, internal condensing surfaces and heat interchange and:

Fig. 5 is a section taken on line 5—5 of Fig. 4.

Figure 1:
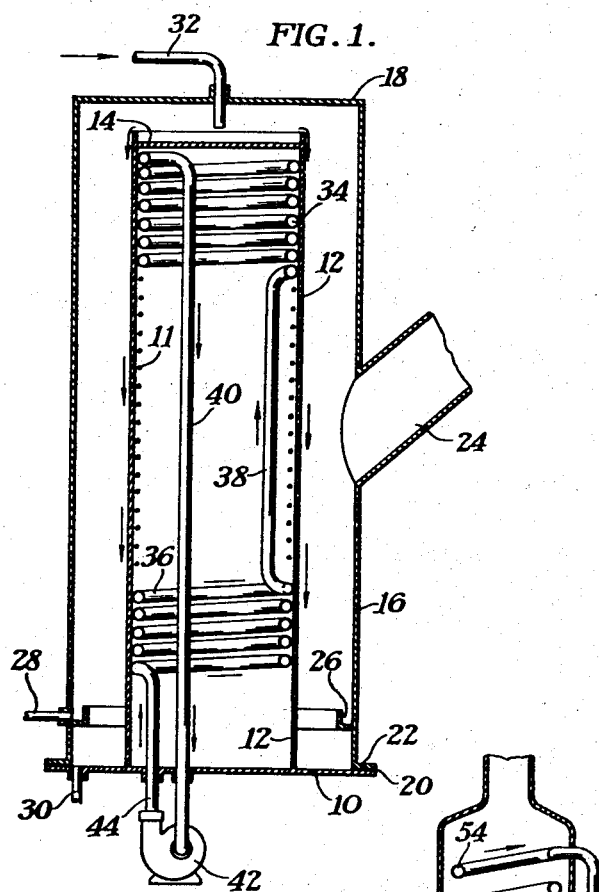
Fig. 1 is a vertical section of an improved gravity flow still embodying the features of my invention.

Referring to Fig. 1, numeral 10 designates a flat, rigid base plate integral with a cylinder 12 which cylinder is closed at the top by a plate 14. Numeral 16 designates a cylinder serving as a still casing which is positioned on plate 10 so as to be substantially concentric with cylinder 12. Numeral 18 indicates a gas-tight end plate integral with cylinder 16. Numeral 20 designates a gasket serving to form a gas-tight joint between plate 10 and flange 22 of cylinder 16. Numeral 24 designates a conduit connected to evacuating pumps (not shown). Numeral 26 designates an annular collar mounted upon the inside wall of casing 16. Numeral 28 designates a conduit connected to the gutter formed by collar 26 and casing 16. Numeral 30 designates a conduit serving to withdraw liquid collecting on the upper part of base plate 10. Numeral 32 indicates a conduit for introducing liquid onto the top of plate 14.

Numeral 34 designates a coiled pipe which makes efficient thermal contact with the upper inside wall of cylinder 12. This can be accomplished by soldering or welding. Numeral 36 designates a similar coil which is similarly mounted upon the lower inside wall of cylinder 12. Numeral 38 designates a conduit which connects coil 36 with coil 34. Numeral 40 designates a conduit which connects the top part of coil 34 to the intake of circulating pump 42. Numeral 44 designates a conduit connecting the exhaust side of the pump 42 to the lower portion of coil 36.

Figure 2:
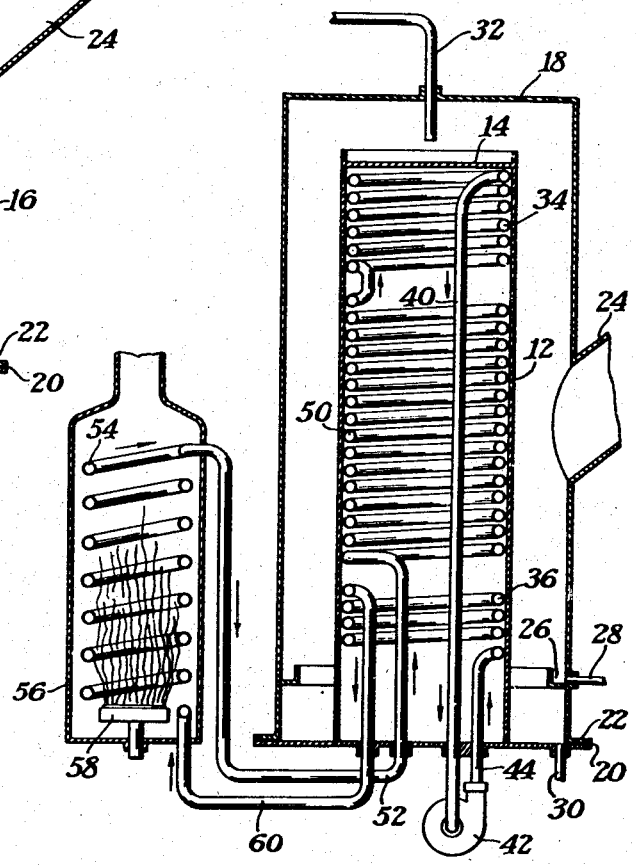
Fig. 2 is a vertical section of a gravity flow still similar to that illustrated in Fig. 1 differing therefrom mainly in that an auxiliary external heater is used to heat the main portion of the vaporizing surface of the still.

Referring to Fig. 2 numeral 50 designates a central coil making efficient thermal contact with the central inside wall of cylinder 12. The upper end of this coil connects to the lower end of coil 36 while the lower end of this coil connects to a conduit 52 which leads to an external heating coil 54 surrounded by a furnace 56 and heated by a burner 58. Numeral 60 designates a conduit which connects the upper portion of coil 36 to the lower portion of external heating coil 54.

Referring to Fig. 3, numerals 70 and 72 designate respectively a base plate and a drum-shaped cover which cooperate to form a gas-tight casing for a centrifugal vacuum still of well-known type. Numeral 74 designates evacuating conduits leading evacuating pumps (not shown). Numeral 76 designates an annular gutter integral with the upper portion of 72 to which is connected a withdrawal conduit 78. Numeral 80 designates a circular, shallow cone-shaped vaporizing surface rotatably mounted upon shaft 82 which is rigidly held in the position shown by bearings 84. The shaft passes through the base plate 70 and is provided with a gas-tight packed gland 86. Numeral 88 designates an annular gutter into which the periphery of vaporizing plate 80 extends. Numeral 90 designates a withdrawal conduit connected to gutter 88.

Numeral 92 designates a helical coil integral with the central part of plate 80 and making efficient thermal contact therewith. Numeral 94 designates a helical coil of larger diameter than coil 92 and integral with the outside portion of plate 80. Numeral 96 designates a conduit connecting the inside end of coil 92 to the intake of pump 98. Numeral 97 designates a reservoir or expansion chamber for extra heat exchange liquid which is connected to the intake of pump 98 by conduit 99 which gradually increases in distance from shaft 82 as it passes from reservoir 97 to the intake of pump 98. Numeral 100 designates a conduit connecting the other end of coil 92 with the inside end of coil 94. Numeral 102 designates a conduit which connects the outside end of coil 94 with the intake of pump 98. Numeral 104 designates a conduit for introducing distilland onto the center of vaporizing plate 80, while numeral 106 indicates an electrical resistance wire for heating the center portion of vaporizing plate 80, the heat being reflected toward plate 80 by reflector 108. Numeral 110 designates a stationary gear rigidly mounted upon support 112 so as to engage with gear 114 which drives pump 98.

Referring to Figs. 4 and 5 numeral 120 designates a rigid base plate upon which is mounted gas-tight conical still casing 122 which is provided with an evacuating conduit 124. Casing 122 is provided with a gas-tight cover or end plate 126 through which passes a stationary hollow shaft 128 which is rigidly mounted in the position shown by being integrally fastened to support 130 and to base plate 120. Numeral 132 designates a cone of about the same shape as casing 122 but of smaller diameter which is rigid but rotatably mounted in the position shown by means of bearings 134 and 136. The inner half of bearings 134 and 136 are mounted upon the wall of shaft 128 in a stationary manner. The outer half of bearing 134 is integral with the upper wall of rotating conical element 132 while the outer half of bearing 136 is integral with plate 138, which in turn is rigidly fastened to the lower portion of cone 132 by flange 140 as illustrated. Plate 138 is provided with a number of holes 142 while the upper portion of cone 132 is provided with a number of perforations 144 to permit the egress of gases. Flange 140 is provided with a plurality of spacers so as to permit liquid accumulating inside cone 132 to pass between the two elements of the flange and into gutter 146. Numeral 148 designates a conduit for withdrawing liquid from gutter 146. Numeral 150 designates a conduit for introducing distilland onto the inside upper wall of cone 132. Numerals 152 and 154 designate heat-exchange coils upon the inside upper and lower walls of conical element 132 respectively. These coils are connected together and to circulating pump 98 as previously described.

Numerals 156, 158 and 160 designate superimposed cylindrical condensing surfaces positioned inside cone 152. These surfaces are stationary and are provided at the lower edge of each with gutters 162, 164 and 166 respectively. These condensing surfaces are cooled by means of internal cooling coils 168, 170, and 172 through which cooling fluid is circulated by introduction through conduit 174 and withdrawal through conduit 176. Condensate collecting in gutters 162, 164 and 166 is withdrawn respectively through conduits 178, 180 and 182.

Numeral 184 designates a gear integral with the outwardly turned lip of plate 138. The gear is driven by driving gear 186, which is in turn driven by shaft 188, which passes through packed gland 190.

In operating the apparatus illustrated in Fig. 1, the still is evacuated by means of pumps connected to conduit 24. Liquid to be distilled is introduced through conduit 32. Heating element comprising an electrical resistance wire 11 is put into operation and circulating pump 42 is started. Distilland collects on plate 14, flows over the upper edge of 12 and downward in a thin film on the outside surface of 12. When this thin film reaches the area heated by heater 11 it is partially distilled. The vapors thus formed condense on the inside wall of outer casing 16, flow by gravity into gutter 26 and are withdrawn through conduit 28. The hot undistilled residue on column 12 then flows in a thin film over the lower portion of column 12 opposite heat recovery coil 36. A heat transfer liquid such as diphenyl or "Dowtherm" in coil 36 is then heated to an elevated temperature. This hot liquid then flows upwardly through conduit 38 and preheating coil 34 due to the action of circulating pump 42. The distilland as it flows in a thin film over the upward portion of column 12 is thus preheated while it is subjected to the vacuum distillation conditions. If the liquid should be preheated to distillation temperature while still on the area of the preheater, it could distill and no unusual thermal decomposition, therefore, would take place. The cool heat transfer agent is then circulated downward through conduit 40 and circulating pump 42 and is again passed through the heat-recovery coil 36. These operations are repeated throughout the distillation process. Undistilled residue accumulates on the upper surface of 10 and is withdrawn through conduit 30.

In operating the apparatus illustrated in Fig. 2, the still is put into operation the same as described in Fig. 1. Burner 58 is put into operation. The heat-exchange fluid is then circulated by pump 42. The fluid first passes through coil 36 where it picks up heat from the undistilled residue on the lower outside wall of cylinder 12. This partially heated fluid then passes through conduit 60 into heater coil 54 where it is further heated. It then passes through conduit 52 into heater coil 50 where it heats the central portion of cylinder 12 to distillation temperature. The liquid is partially cooled by giving up some of its heat content to the distilland and this partially cooled heat-exchange liquid then flows through coil 34 where it partially preheats the distilland at the top of cylinder 12. The cool heat-exchange liquid then is returned through the cycle by circulating pump 42.

In operating the apparatus illustrated in Fig. 3, shaft 82 is caused to rotate by force applied outside of the still. Liquid to be distilled is introduced through conduit 104 onto the center of rotating plate 80. The system is evacuated through conduits 74 and the vaporizing surface 80 is heated to distillation temperature in the central portion thereof by heater 106. The distilland is caused to flow from the center to the periphery of 80 in the form of a thin film. During passage over the central portion it is heated to distillation temperature by heater 106. Vapors given off are condensed on the upper wall, flow by gravity into gutter 76, and are withdrawn from the still through conduit 78. Undistilled residue is thrown from the periphery of 80 into gutter 88 and is withdrawn through conduit 90. Coils 92 and 94, contain heat-exchange liquid. During rotation pump 98 rotates with plate 80. Since gear 110 is stationary, gear 114 is caused to rotate and this actuates pump 98. Heat-exchange liquid is caused to flow by the action of the pump 98 from coil 94 into coil 92 and thence by way of conduit 100 back into coil 94. Heat is taken up from the undistilled residue by coil 94 and is conveyed to coil 92 where the heat is given up to the distilland when it is first introduced onto the vaporizing plate 80 in order to preheat it. The distilland is thus preheated while subjected to the vacuum and while it can distill as soon as it becomes preheated to distillation temperature. There is, therefore, no lag between preheating and distillation.

In operating the apparatus illustrated in Figs. 4 and 5, the system is evacuated through conduit 124. Cone 132 and integral pump 98 and heat-exchange coils 152 and 154, are rotated as an integral unit by force applied through shaft 188, gear 186 and gear 184. Liquid to be distilled is introduced through conduit 150 onto the inside upper surface 132. The liquid flows in a thin film by a combination of gravitational and centrifugal force to the bottom of cone 132, and is then thrown between the elements of flange 140 into gutter 146, and is withdrawn as undistilled residue through conduit 148. Gases present in the distillation chamber, i. e., gases inside cone 132, pass through holes 142 at the base and perforations 144 at the top are then withdrawn through conduit 124.

Undistilled residue heats coil 154, as previously explained. This coil contains heat-exchange fluid which then is forced by circulating pump 98 up into preheating coil 152, where the distilland is preheated. The somewhat cool heat-exchange fluid is then returned by circulating pump 98 to coil 154 as previously described. The central portion of vaporizing surface 132 is heated by electrical coil 106 and reflector 108 as described in connection with Fig. 3.

Cooling fluid is circulated through coils 168, 170 and 172. Therefore, vapors generated on the inside surface of 132 are condensed upon the cool outer surfaces of cylinders 156, 158, and 160. Three fractions are separated on these surfaces. These fractions flow by gravity respectively into conduits 162, 164, and 166, and are withdrawn respectively through withdrawal conduits 178, 180, and 182.

My invention is of particular importance in connection with the preheating of thermally decomposable substances while in a thin film and while under vacuum distillation conditions. The similar treatment of the undistilled residue, i. e., while it is in the form of a thin film and under vacuum conditions is important only where it is to be further distilled to recover thermally decomposable substances. Obviously if all the decomposable substances have been recovered therefrom or it is not to be further distilled it is not important to avoid thermal decomposition or to handle the undistilled residue carefully. Therefore, it is to be understood that my invention is applicable in such cases only to the preheating step and that the residue may be collected and heat regeneration accomplished in any manner so long as the regenerated heat is circulated back to the incoming distilland while it is in the form of a thin film and under vacuum conditions.

What I claim is:

1. High-vacuum distillation apparatus comprising in combination a vaporizing surface, a condensing surface, means for heating the vaporizing surface, means for distributing distilland onto the vaporizing surface in a thin film, means for removing undistilled residue from the vaporizing surface, means for recovering heat from the undistilled residue while it remains in the form of a thin film in the still, means for transferring this recovered heat to the incoming distilland while it is in the still, while it is in the form of a thin film and immediately previous to its passage onto the vaporizing surface, and means for removing condensate from the condensing surface.

2. High-vacuum distillation apparatus comprising in combination a vaporizing surface, a condensing surface, means for heating the vaporizing surface, means for distributing distilland onto the vaporizing surface in a thin film, means for removing undistilled residue from the vaporizing surface, means for recovering heat from the undistilled residue, means for transferring this recovered heat to the incoming distilland while it is in the still, while it is in the form of a thin film while it is exposed to the high vacuum in the still and immediately previous to its passage onto the vaporizing surface in the form of a thin film, and means for removing condensate from the condensing surface.

3. High-vacuum unobstructed path distillation apparatus comprising in combination a vaporizing surface, a condensing surface, separated from the vaporizing surface by substantially unobstructed space, means for heating the vaporizing surface, means for distributing distilland on the vaporizing surface in a thin film, means for removing undistilled residue from the vaporizing surface, means for recovering heat from the undistilled residue while it remains in the form of a thin film in the still, means for transferring this recovered heat to the incoming distilland while it is in the form of a thin film in the still, and immediately previous to its passage onto the vaporizing surface, and means for removing condensate from the condensing surface.

4. High-vacuum unobstructed path distillation apparatus comprising in combination a vaporizing surface, a condensing surface separated from the vaporizing surface by substantially unobstructed space, means for heating the vaporizing surface, means for distributing distilland onto the vaporizing surface in a thin film, means for removing undistilled residue from the vaporizing surface, means for recovering heat from the undistilled residue while it remains in the form of a thin film in the still, means for transferring recovered heat to a liquid, means for conveying this heated liquid into thermal contact with the incoming distilland while it is in the form of a thin film in the still and immediately previous to its passage onto the vaporizing surface, and means for removing condensate from the condensing surface.

5. High-vacuum unobstructed path distillation apparatus comprising in combination a vaporizing surface adapted to cause distilland to flow thereover in a thin film by centrifugal force, a condensing surface separated from the vaporizing surface by substantially unobstructed space, means for heating the vaporizing surface, means for introducing distilland onto the vaporizing surface, means for removing undistilled residue from the vaporizing surface, means for recovering heat from the undistilled residue while it remains in the form of a thin film in the still and for transferring it to a liquid, means for adding additional heat to this partially heated liquid, means for circulating this heated liquid into thermal contact with the vaporizing surface and then into thermal contact with incoming distilland while it is in the form of a thin film in the still and immediately previous to its passage onto the vaporizing surface, and means for removing condensate from the condensing surface.

6. High-vacuum unobstructed path distillation apparatus comprising in combination a vaporizing surface adapted to cause distilland to flow thereover in a thin film by centrifugal force, a condensing surface separated from the vaporizing surface by substantially unobstructed space, means for introducing distilland onto the vaporizing surface, means for removing undistilled residue from the vaporizing surface, means for recovering heat from the undistilled residue while it remains in the form of a thin film on the outermost part of the centrifugal vaporizing surface, means for transferring this recovered heat to the incoming distilland while it is in the form of a thin film on the innermost part of the centrifugal vaporizing surface, and means for removing condensate from the condensing surface.

7. High-vacuum unobstructed path distillation apparatus comprising in combination a vaporizing surface, a condensing surface separated from the vaporizing surface by substantially unobstructed space, means for heating the vaporizing surface, means for distributing distilland onto the vaporizing surface in a thin film, means for removing undistilled residue from the vaporizing surface, means constituting a continuation of the vaporizing surface for recovering heat from the undistilled residue while it is in the form of a thin film and while it is exposed to the vacuum conditions prevailing in the still, means constituting a preheating portion of the vaporizing surface for transferring this recovered heat to the incoming distilland while the distilland is spread thereon in the form of a thin film, and while it is exposed to the vacuum conditions prevailing in the still, and means for removing condensate from the condensing surface.

8. The process of high-vacuum distillation comprising subjecting an organic substance which tends to decompose at a temperature necessary for distillation to high-vacuum distillation while in the form of a thin film, recovering heat from the undistilled residue while it remains in the still, while it is exposed to the vacuum therein, and while it is in the form of a thin film, and conveying the recovered heat to the incoming organic substance while it is in the form of a thin film and while it is exposed to the vacuum conditions prevailing during the vacuum distillation.

9. The process of high-vacuum distillation comprising subjecting a thin film of an organic substance which tends to decompose at a temperature necessary for distillation to high-vacuum distillation by causing it to flow over a heated vaporizing surface in the form of a thin film, recovering heat from the undistilled residue as it flows in a thin film over the last part of the vaporizing surface and conveying the recovered heat to the incoming organic substance while it is in the form of a thin film on the first part of the vaporizing surface.

10. The process of high-vacuum distillation comprising subjecting a thin film of an organic substance which tends to decompose at a temperature necessary for distillation to high-vacuum distillation by causing it to flow over a heated vaporizing surface in the form of a thin film, recovering heat from the undistilled residue, conveying the recovered heat to the incoming organic substance while it is in the form of a thin film within the still and while it is exposed to the high vacuum in the still and then immediately heating this preheated thin film to distillation temperature.

11. The process of high-vacuum distillation comprising subjecting an organic substance which tends to decompose at a temperature necessary for distillation to high-vacuum distillation by causing it to flow in the form of a thin film by centrifugal force over a heated vaporizing surface, recovering heat from the undistilled residue at the outermost portion of the vaporizing surface and while the undistilled residue from which the heat is recovered is still in the form of a thin film, and conveying this recovered heat to the innermost portion of the centrifugal surface upon which the incoming distilland is disposed in the form of a thin film by centrifugal force.

KENNETH C. D. HICKMAN.